United States Patent [19]

Marsaly et al.

[11] Patent Number: 4,858,144

[45] Date of Patent: Aug. 15, 1989

[54] DETECTION OF ANOMALIES IN GAS FLUIDIZED BED POLYMERIZATION

[75] Inventors: Alain Marsaly, Gignac la Nerthe; Andre Martens, Chateauneuf les Martigues; Frederic R. M. M. Morterol, Sausset-les-Pins; Charles Raufast, Saint Julien les Martigues, all of France

[73] Assignee: BP Chemicals Limited, London, England

[21] Appl. No.: 13,696

[22] Filed: Feb. 12, 1987

[30] Foreign Application Priority Data

Feb. 19, 1986 [FR] France .................. 8602270

[51] Int. Cl.⁴ .................. F23G 5/00
[52] U.S. Cl. .................. 364/496; 364/558; 364/572; 364/579
[58] Field of Search .................. 364/496-500, 364/507, 558, 572, 579, 576; 73/23, 23.1

[56] References Cited

FOREIGN PATENT DOCUMENTS 93801 11/1983 European Pat. Off. .
3006754 2/1979 Fed. Rep. of Germany .

OTHER PUBLICATIONS

Shuster et al., Chemical Engineering Progress, vol. 48, No. 9, Sep. 1952, "The Measurement of Fluidization Quality", pp. 455–458.
Sadasivan et al., Powder Technology, vol. 26, 1980, pp. 67–74, "Studies on Frequency and Magnitude of Fluctuations of Pressure Drop in Gas-Solid Fluidised Beds".

Primary Examiner—Parshotam S. Lall
Assistant Examiner—Ellis B. Ramirez
Attorney, Agent, or Firm—Brooks Haidt Haffner & Delahunty

[57] ABSTRACT

A process for detecting anomalies in a fluidized bed, e.g. the incidence of agglomeration in gas-fluidized bed polymerization, comprises sensing and converting into electrical signals the pressure at one level, or the pressure difference between two or more levels in the reactor, processing these signals by computer to produce a pressure spectrum and comparing with a reference spectrum obtained in the absence of anomalies. The device comprises one or more pressure sensors 11,12,13, which measure the pressure at various levels in the reactor 1, and a computer 27.

13 Claims, 3 Drawing Sheets

DETECTION OF ANOMALIES IN GAS FLUIDIZED BED POLYMERIZATION

The present invention relates to a process and to a device for detecting anomalies in the operation of fluidised-bed apparatus and the application to fluidised bed reactors for the gas phase polymerisation of alpha-olefins.

The technical field of the invention is that of the construction and the control of plants employing fluidised beds.

It is known that fluidised beds consists of fine solid particles which are maintained in an upward stream of gas under such conditions that the two combined phases, solid and gaseous, have properties which are similar to those of a fluid. Fluidised beds are employed in many industrial applications which involve exchanges between a gaseous phase and solid particles.

The process and device according to the invention can be applied in all industrial plants incorporating fluidised bed apparatus, for example in the catalytic gas phase polymerisation of alpha-olefins. In the following description, particular reference will be made to gas fluidised bed polymerisation.

Other known applications of fluidised beds, are, for example, coal gasification, catalytic cracking of hydrocarbons, coal coking, and granulation of pulverulent solid substances such as fertilizers, cement, lime, inorganic or organic substances, and the like.

The control of fluidised bed apparatus requires the ability to monitor the state of the fluidised bed continuously to detect anomalies, in order to avoid undesirable incidents during operation.

In the particular case of a fluidised bed reactor used for the polymerisation or copolymerisation of alpha-olefins, it is highly important to avoid the formation of accumulations of sticky polymer particles which agglomerate together. In fact, as soon as they are formed, such accumulations form obstacles to gas circulation and disturb the hydrodynamic equilibrium of the bed by modifying its particle size distribution. Because of the low thermal conductivity of polymers, the formation of these accumulations gives rise to cooling defects, leading to local hot-spots which, in their turn, cause the polymer particles to soften, so that there is a danger that the formation of accumulations may propagate very rapidly throughout the fluidised bed, producing agglomerates or solid nodules which settle through the fluidised bed, which collect on the fluidisation grid, and which can require the reactor to be shut down. These sticky particles can also deposit on the reactor walls or on the fluidisation grid, partly obstructing the latter.

Other anomalies may appear in a fluidised bed as a result of a decrease in the size of the solid particles due, for example, to their breaking up or erosion. In this case, the finer particles may be entrained outside the reactor and may partially or completely obstruct the pipework and the gas/solid separation units such as cyclones or filters arranged in the gas recycle loop. Such anomalies also lead to plant shut-down.

An object of the present invention is to provide means which make it possible to detect anomalies in the operation of the fluidised bed sufficiently early to make it possible to provide a remedy and accordingly to avoid the need to shut-down or interrupt the normal operation of the plant.

In the particular case of a fluidised bed reactor for the polymerisation or copolymerisation of alpha-olefins, this objective consists in providing means which make it possible, for example, to detect the formation of solid agglomerates or nodules in the fluidised bed sufficiently early to prevent localised melting of the polymer.

At the present time, detection of the presence of solid agglomerates or nodules in a fluidised bed remains a problem which has not been satisfactorily solved.

An attempted solution comprises fitting a fluidised bed unit with transparent windows enabling the bed to be seen, but this is not satisfactory because these windows permit only the surface regions to be seen and are quickly coated with deposits which make them opaque.

European Patent Application No. 81302516.0 (Union Carbide Corp.) describes methods which consist in arranging a radioactive source inside the fluidised bed and radiation detectors at the periphery of the reactor. This process has the disadvantage of requiring the use of a radioactive source, and hence safety precautions. Furthermore, it requires the presence of a radioactive source inside the fluidised bed, which disturbs the gas flow. Lastly, this process operates retrospectively, since it detects the presence of solid agglomerates or nodules which have already formed and which have gravitated down to the level of the fluidisation grid, where the source and the detectors are generally situated.

Fluidised bed units are generally equipped with temperature sensors and pressure or differential pressure sensors, and these sensors warn the reactor control personnel when they detect temperature or pressure changes which show that the physical parameters of the fluidised bed are changing, but the readings given by these devices do not provide means to detect the presence of solid agglomerates or nodules in a fluidised bed.

Theoretical studies of the physics of fluidised beds show that certain physical parameters exhibit fluctuations.

When the pressure is continuously monitored at a point in the fluidised bed, or when the pressure difference is measured between two points situated at two different levels in a fluidised bed, it is found that the pressure or the differential pressure oscillates about a mean value. The differential pressure is the sum of a pressure of a hydrostatic type, which depends on the height and the density of the fluid present in the column separating the two measurement points, and of a decrease in pressure, of the pressure-drop type, which depends on dynamic flow parameters (viscosity, velocity, Reynolds number, bubble size and frequency).

It might be considered, therefore, that any changes taking place in the composition or the structure of the fluidised bed might be detectable by monitoring the consequent fluctuations in the pressure or in the differential pressure measured between two fixed points in a fluidised bed.

However, it is not possible to detect the presence of an anomaly merely by observing the pressure readings or the differential pressure readings taken within the fluidised bed reactor. This is because the overall fluctuations of the pressures within the reactor are rapid and erratic and hide the specific variations of pressure which are caused by such anomalies.

The hydrodynamic behaviour of fluidised beds has already formed the subject of scientific studies. In these studies, methods of spectral analysis of oscillating signals have been applied, in particular, to differential pressure measurements made between two levels in a fluidised bed, in order to determine the spectrum of the frequencies present in these signals and to determine the effect of various physical parameters on the operation of fluidised beds.

It is known that oscillating signals can be resolved into a sum of periodic signals of determined frequencies.

There is a mathematical technique, known as Fourier transformation, which makes it possible to analyse the periodic structure of an oscillating signal in order to produce a frequency spectrum of the said signal, that is to say a graph on which the frequencies are plotted on the abscissa axis and the maximum amplitudes of the signal components corresponding to the various frequencies present in this signal are plotted along the ordinate axis.

Without going into the mathematical detail of this method, it will be merely recalled that the Fourier transformation $F_w$ of a variable signal $f_t$ consists in calculating a complex value:

$$F_w = \int_O^T f_t e^{-jwt} dt$$

for each pulsation, w, $\int$ being the integration sign, j being the imaginary number $\sqrt{-1}$ and $w = 2\pi f$, f being the frequency.

A spectrum known as an autocorrelation spectrum is also calculated, which is the product of each complex value $F_w$ and its conjugate value $F^*_w$, so that the value obtained is equal to the square of the modulus of the complex value $F_w$.

It is also possible to calculate a cross-spectrum known as an intercorrelation spectrum, by multiplying each complex value $F_w$ by the conjugate complex value $G^*_w$, obtained by applying a Fourier transformation to a second signal, measured simultaneously at another point.

The autocorrelation spectrum makes it possible to determine the signal frequency; the intercorrelation spectrum makes it possible to eliminate noise signals which show no correlation with each other, especially random noise.

Fourier transformation, as well as calculations of autocorrelation or intercorrelation spectra require numerous operations which are performed in a computer which is programmed to do the necessary calculations.

A paper by N. SADASIVAN, D. BARRETEAU and C. LAGUERIE, published in POWDER TECHNOLOGY 26 (1980), Pages 67 to 74, entitled: "Studies of the frequency and amplitude of pressure drop fluctuations in gas-solid fluidised beds", shows that, under normal operating conditions of fluidised bed units, the characteristic frequency of the differential pressure fluctuations decreases when the mean diameter of the solid particles increases.

By applying spectral analysis methods to differential pressure signals issued by differential sensors connected to two pressure pickups situated at two different levels in a fluidised bed apparatus, the inventors of the present invention found that in a normal operating regime the autocorrelation spectrum of a signal or the intercorrelation spectrum of two similtaneous signals are continuous spectra which are situated in a low-frequency range which varies according to the reactor dimensions, the nature of the fluidised bed and the bubble frequency.

On the other hand, when the fluidised bed operating regime is perturbed by the appearance of anomalies such as agglomerates, the spectra produced by the analysis of the pressure signals show a second spectrum or band which is distinct from the earlier spectrum and which is shifted towards high frequencies. The observation of the existence of a secondary spectrum distinct from the principal spectrum of the differential pressure signals and in correlation with the appearance of anomalies in a fluidised bed, has not been reported and constitutes an unexpected observation.

The process and device according to the present invention are industrial applications of the above-mentioned observation.

The present invention provides a process for detecting anomalies in a fluidised bed contained in an enclosure comprising continuously or intermittently sensing the pressure at one level in the fluidised bed or sensing the pressure difference between at least two levels, at least one of which is in the fluidised bed, the pressure or the pressure difference being sensed by a pressure sensor which produces an analog signal, determining the normal spectrum of frequencies present in the said signal when the fluidised bed operates under the normal conditions free from anomalies, and detecting the appearance in the said signal of frequencies distinct from the normal spectrum which correspond to the presence of anomalies in the fluid bed.

Advantageously, the detection of the frequencies distinct from the normal spectrum is carried out by means of filters which cancel all the frequencies situated in the normal spectrum.

According to a preferred embodiment, the pressure difference is measured between two levels situated within the reactor. Preferably one of these levels is situated in the fluidised bed immediately above the fluidisation grid, and the other is situated above the first, inside or outside the fluidised bed.

Advantageously, the distance between the two levels is between 1 and 4 m and, preferably, between 1.5 and 3 m.

A device according to the invention, for detecting anomalies in a fluidised bed contained in an enclosure, comprises one or more pressure sensors which measure the pressure at least at one level in the fluidised bed or which measure the pressure difference between two pressure pickups entering the said enclosure at least at two different levels, at least one of which is in the said fluidised bed, means for processing the analog signals issued by the said pressure sensors in order to determine the normal spectrum of the frequencies present in each signal in a normal operating regime of the said fluidised bed, and means for detecting the appearance of frequencies distinct from the said normal spectrum which indicate the presence of anomalies in the operation of the said fluidised bed.

According to a preferred embodiment each pressure sensor is a differential pressure sensor comprising two small pressure-pickup tubes which enter the said enclosure at two different levels and whose ends are equipped with a porous filter made of metal or of sintered ceramic, which tubes are connected to a differential piezoelectric transducer, and each sensor additionally comprises a neutral gas sweeping line which is connected to each pressure-pickup tube downstream of the said filter.

According to a particular embodiment, the means for processing the analog in order to determine the normal frequency spectrum and the appearance of frequencies distinct from the said normal spectrum, comprises a computer which is programmed to sample the signals, to calculate their mean value, to calculate the differences between the instantaneous values and the said value, to carry out a Fourier transformation of the said differences, to calculate the autocorrelation and/or intercorrelation spectra and to display the latter.

Once the Fourier transformation analysis has been carried out and has made it possible to detect the normal spectrum and the frequencies which are distinct from the said spectrum and which are characteristic of the anomalies, a device according to the invention may comprise any means of analysis or filtration capable of discriminating between these frequencies and background noise. The means of analysis by means of a Fourier transform constitutes special means of detection of the frequencies distinct from the normal spectrum which may be replaced by other equivalent means.

As a result, the invention provides new means making it possible to detect operation anomalies in fluidised bed units shortly after they appear and, consequently, making it possible to prevent more serious anomalies and to avoid possible shut-downs of a fluidised bed unit.

In the particular case of reactors for catalytic polymerisation or copolymerisation of alpha-olefins in a fluidised bed, the process and device according to the invention enable changes in the physical state of the fluidised bed particles to be detected shortly after they appear and in a highly reliable manner, especially the formation of agglomerates which would quickly lead to the formation of solid nodules in the fluidised bed or of deposits clinging to the walls or to the fluidisation grid.

Systematic tests have been carried out on a pilot plant. During these tests the autocorrelation spectrum of a differential pressure signal measured between a level situated slightly above the fluidisation grid and a level situated above the fluidised bed has been calculated and displayed.

These tests have shown that for the particular apparatus operating in a stabilised normal regime, the spectrum produced contained only frequencies below 2 Hz and that, each time fluidisation incidents occurred, clearly distinguishable frequency peaks appeared in a band of between 5 Hz and 13 Hz, and thus well distinct from the normal spectrum.

The spectral analysis method using the Fourier transformation of pressure signals makes it possible to carry out a preliminary standardisation of any fluidised bed to determine the normal frequency spectrum, that is to say the spectrum in a normal operation regime, which varies with the nature of the fluidised bed.

Once the normal spectrum is known, it is sufficient to detect the appearance of frequencies located outside the normal spectrum, and this can be done by any means of filtration analysis which is capable of discriminating between background noise and the spectrum of frequencies which is characteristic of the presence of anomalies, for example using spectral analysis with a Fourier transformation or by any other equivalent means.

If, for example, it has been found that the normal spectrum consists of low frequencies between 0 and 3 Hz and that anomalies in operation were associated with frequencies of between 5 Hz and 10 Hz, then it suffices to isolate the pass band between 5 Hz and 10 Hz and to detect the appearance of a signal within this pass band.

The spectra obtained in this manner may be displayed on a screen, may be recorded and/or may be introduced into the device for controlling the fluidised bed unit, for example temperature controlling means, pressure controlling means, catalyst feeding means or means for introducing into or discharging from the reactor the various reactants employed or products being manufactured.

The appearance of an abnormal spectrum can thus be detected visually, can trigger an alarm and/or can trigger automatic means for correcting the operating conditions of the fluidised bed unit.

In the case of these reactors for the polymerisation or copolymerisation of alpha-olefins, the correcting means may consist of a decrease in the fluidisation temperature, a reduction in the rate of introduction of the catalyst and/or any other change in the physicochemical parameters affecting the polymerisation or copolymerisation of alpha-olefins.

The following description refers to the attached drawings which show, without being limiting in nature, examples of implementation of the invention.

Figure 1:
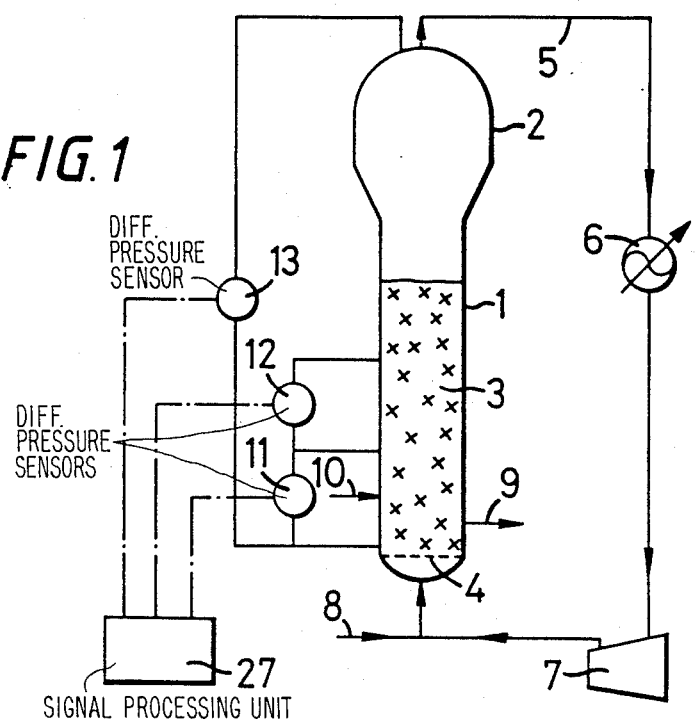
FIG. 1 depicts diagrammatically a reactor for the catalytic polymerisation or copolymerisation of olefins in a fluidised bed, fitted with a device according to the invention.
Figure 2:
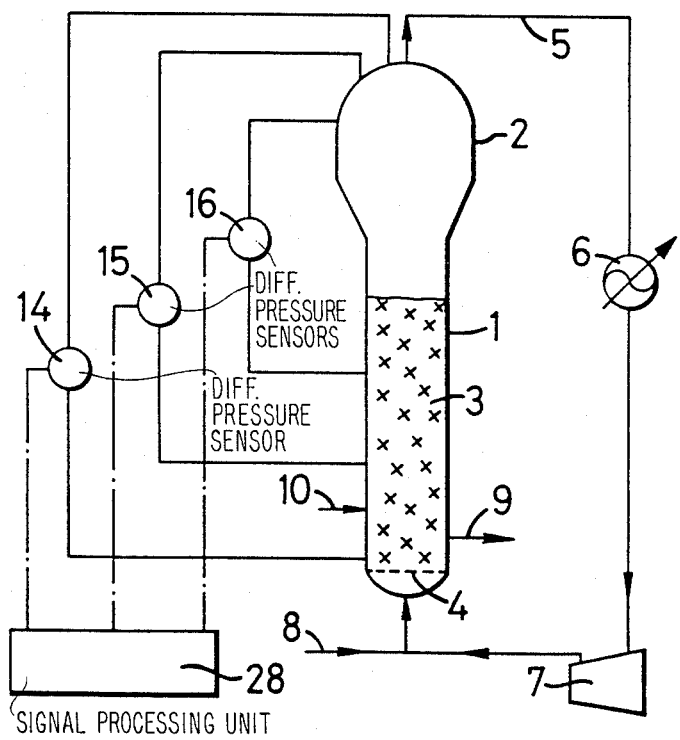
FIG. 2 depicts diagrammatically the same type of reactor fitted with a second device according to the invention.

FIGS. 1 and 2 show diagrammatically the essential components of a reactor used to produce alpha-olefin polymers or copolymers catalytically in a fluidised bed. This type of reactor is well known and there is no need to describe it in detail. The reactor 1 is a steel cylinder comprising, at the top, a cylindroconical part 2, wider in cross-section and known as the or velocity reduction disengagement zone, in which the upward velocity of the gas is reduced, permitting the particles of polyolefins entrained with the gas to fall back into the fluidised bed. The reactor 1 contains a bed 3 of polyolefin particles which are maintained in the form of a fluidised bed by an upward stream of gas which is introduced at the base of the reactor through a fluidisation grid 4. The reactor comprises a recycle loop 5 for the gases leaving at the top of the reactor. These gases, which are hot because of the heat released by the polymerisation reaction, pass through a cooler exchanger 6 and are drawn into a compressor 7 which delivers them under the fluidisation grid 4. The reactor comprises an inlet 8 for the gas to be polymerised, a polymer outlet 9 and a catalyst entry 10. Proper operation of a reactor of this type requires the fluidised bed 3 to remain stable.

FIG. 1 shows a reactor which is fitted with three differential pressure sensors 11, 12 and 13, which are coupled, that is to say that two sensors have a common pressure-pickup. Thus, the sensors 11 and 12 have a common pressure-pickup situated in the fluidised bed and the sensors 11 and 13 have a common pressure-pickup situated slightly above the grid 4.

FIG. 2 shows a second embodiment of a similar device comprising three differential pressure sensors 14, 15 and 16, which are arranged in an uncoupled manner, the pressure-pickups of the various sensors being independent.

In FIGS. 1 and 2 it can be seen that all the differential pressure sensors have at least one pressure-pickup situated inside the fluidised bed 3, and the second pickup may be also in the fluidised bed or alternatively above the latter.

FIGS. 1 and 2 show a signal processing unit 27, 28 to which the differential pressure sensors 11, 12, 13 or 14, 15 and 16, are connected. The units 27 and 28 may consist of a computer, for example a process computer which controls the operation of the reactor or of an independent computer.

In any case, the processing unit 27 or 28 comprises interface circuits, including a sampler which, at regular intervals and at a very high frequency, takes a sample of each analog signal and converts it into a numerical value which is stored in a memory.

The processing unit includes a central calculating unit which calculates the mean value $\bar{f}_t$ of each signal $f_t$ and which subtracts this means value from the instantaneous value, so that the difference $\hat{f}_t = f_t - \bar{f}_t$ is a signal which oscillates about zero.

The calculating unit is programmed to carry out a Fourier transformation (FFT) using the values $\hat{f}_t$, which produces numerical values of a complex function $F_w$ which vary with the pulsation w, that is to say with the frequency f.

The calculating unit is programmed to calculate either an autocorrelation spectrum $F_w \cdot F^*_w = \bar{F}^{-2}w$, or an intercorrelation spectrum $F_w \cdot G^*_w$ between the Fourier transforms of two signals which are measured simultaneously.

This spectral analysis has shown that when a fluidised bed operates in a stabilized regime, that is to say under normal operating conditions, the autocorrelation spectrum of the signal issued by each differential pressure sensor is in the form of a continuous spectrum situated in a range of low frequencies which are less than 3 Hz, and generally less than 2 Hz, the intensities of the signal decreasing towards the high frequencies.

Figure 3:
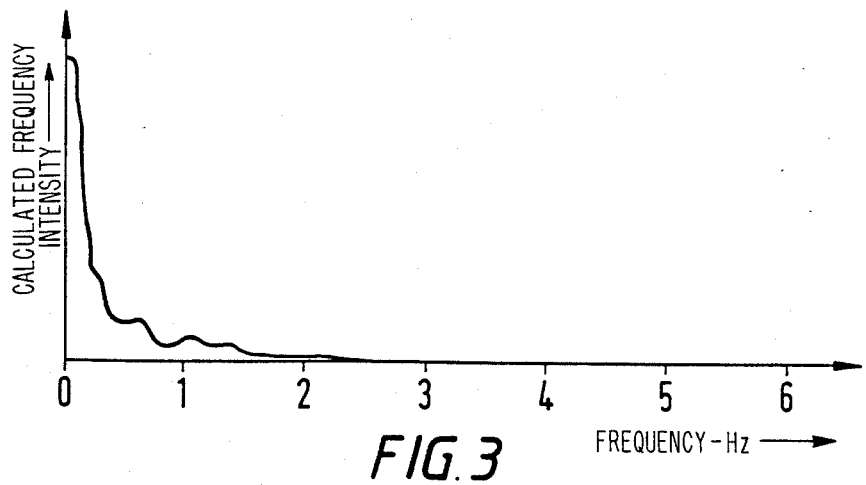
FIG. 3 is a graph showing the autocorrelation spectrum of the differential pressure of a fluidised bed in a normal operating regime.

FIG. 3 shows an autocorrelation spectrum obtained from a signal measured by one of the sensors 13 or 14, that is to say a signal corresponding to the pressure difference between a point situated immediately above the fluidisation grid and a point situated above the surface of the fluidised bed. FIG. 3 shows, along the abscissa axis, the frequecies from 0 to 7 Hz and, along the ordinate axis, the calculated intensities corresponding to the frequencies present in the signal. It can be seen that these frequencies are less than 2 Hz, that the intensities of the frequencies greater than 1.3 Hz are very low, and that the frequency spectrum is practically continuous between 0 and 2 Hz in normal operation.

Figure 4:
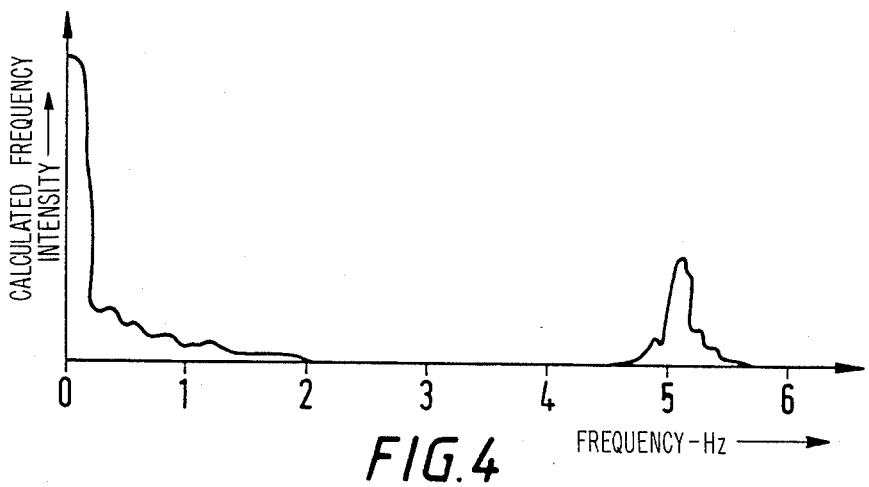
FIG. 4 is a graph showing the autocorrelation spectrum of the differential pressure of a fluidised bed in a perturbed operating regime.

FIG. 4 shows the autocorrelation spectrum of the signal issued by a differential pressure sensor when anomalies are produced in the fluidised bed. It can be seen that this spectrum contains frequencies which are situated at about 5 Hz, that is to say well distinct from the normal spectrum. All the tests carried out have shown the same phenomenon in the case where one of the two pressure-pickups is placed inside the fluidised bed. The frequencies which appear in correlation with anomalies are higher than 3 Hz and are generally between 4 and 15 Hz.

The appearance of these frequencies which are higher than the normal spectrum frequencies takes place when the fluidised bed particles begin to agglomerate together, forming agglomerates, or when relatively sticky particles deposit on the fluidisation grid, forming a layer of unfluidised powder which partly obstructs the fluidisation grid.

It has also been found that when frequencies which are higher than the frequencies obtained in normal operation appear in the signal, this generally precedes the appearance of more serious fluidisation anomalies such as agglomerates or nodules of such sizes or in such quantities that they are liable to necessitate a reactor shutdown. As a result, it suffices first to calibrate the unit to determine the normal frequency spectrum, that is to say the band of frequencies which are found in an analog differential pressure signal when the fluidised bed is in a normal regime and then to detect the appearance and the persistence of markedly higher frequencies, to obtain advance warning of an irregularity in the fluidised bed, and this makes it possible to take measures to prevent this irregularity from increasing and disturbing the operation of the fluidised bed unit.

Figure 5:
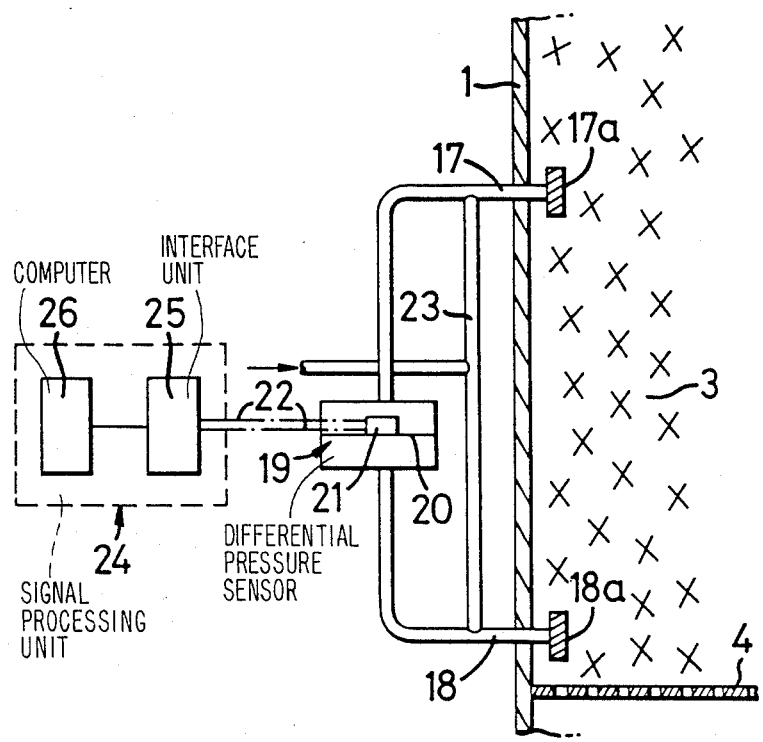
FIG. 5 is a view of a preferred embodiment of a differential pressure sensor device.

FIG. 5 shows a partial vertical section of the reactor 1 containing the fluidised bed 3 situated above the fluidisation grid 4.

This Figure shows a preferred embodiment of a device according to the invention. This comprises two small stainless steel tubes 17, 18 which pass through the reactor wall at two different levels, on the same generatrix of the reactor and which enter the fluidised bed 3 horizontally to a depth of at least five centimetres.

The end of each tube is fitted with a porous plate 17a, 18a, made of sintered metal or ceramic, whose pores are at least 30 microns in diameter, so that the pressure is transmitted through the pores and the polyolefin particles cannot enter the tubes.

Alternatively, the plates 17a, 18a which are fixed to the ends of the tubes could be replaced by porous plugs made of sintered metal or ceramic and placed inside the tubes.

Tubes 17 and 18 are both connected to an electronic differential pressure sensor 19 of any known type.

The sensor 19 is, for example a differential piezoelectric sensor comprising a deformable diaphragm 20, on the two faces of which the two pressures act, and a piezoelectric transducer 21 placed between two electrodes which are connected to two conductors 22 which carry the electrical signal. The diaphragm compresses the piezoelectric element and the latter converts the pressure oscilliations into an electrical voltage, which represents an analog image of the differential pressure.

In order to prevent fouling of the porous plates 17a, 18a, the two tubes 17 and 18 are connected to a small channel 23 which permits a flow of neutral purge gas, for example nitrogen, to circulate slowly through the tubes continuously or noncontinuously, flowing through the porous plates and preventing the fouling of the pores in the latter.

The pressure-drops due to the circulation of the neutral gas through the two plates are equal, so that the differential pressure is not altered by this circulation of purge gas.

The electrical conductors 22 are connected to a signal-processing unit 24.

Unit 24 consists of any means capable of discriminating between background noise and the frequencies which are characteristic of the presence of anomalies.

For example, unit 24 comprises an interface unit comprising an analog-to-digital converter 25 which receives the signal produced by the piezoelectric transducer 21 and which samples it. The unit 24 comprises a computer 26 which is programmed to calculate the mean value of the digital signals and the differences between the instantaneous values of these signals and the said mean value, to carry out a Fourier transformation using these differences, to calculate an autocorrelation or intercorrelation spectrum and to detect in these spectra the presence of frequencies which are situated outside the normal spectrum and which are characteristic of anomalies.

Although the drawings and the description refer to examples of applications to reactors for catalytic polymerisation in a fluidised bed, it must be stated that these examples are not limiting in nature.

The processes and devices according to the invention can be applied to any units comprising a fluidised bed. In each application it suffices to begin with a calibration stage in which the normal frequency spectrum is determined, that is to say the frequency band containing all the frequencies present in a differential pressure signal when the fluidised bed is in stable operating conditions. Once this calibration has been carried out for a fluidised bed of a specified type, it suffices to detect by any known means, either analog or by digital processing, the appearance of peaks of frequencies distinct from the normal spectrum, and this detection provides a highly reliable indication of the appearance of anomalies in the fluidised bed.

The following examples, which are not limiting in nature, illustrate the present invention.

EXAMPLE 1

(a) Preparation of the solid catalyst 2 liters of n-hexane, 3.5 g of iodine and 38.8 g of magnesium powder are introduced in succession under a nitrogen atmosphere, at 20° C., into a 5-liter stainless steel reactor fitted with a stirring system rotating at 750 revolutions per minute and a heating and cooling system. The reaction mixture is heated to 80° C. and 38.7 g of titanium tetrachloride and 67 g of n-propyl titanate are first added quickly, followed by 232 g of n-butyl chloride, added slowly over 4 hours. After this period, the mixture is kept stirred for 2 hours at 80° C. and the solid catalyst (A) is obtained as a suspension in n-hexane.

Analysis of the solid catalyst (A) shows that it contains:
- 0.9 gram-atom of trivalent titanium,
- 0.1 gram-atom of tetravalent titanium,
- 3.7 gram-atoms of magnesium and
- 8.5 gram-atoms of chlorine, per gram-atom of titanium, and that the composition of the solid catalyst (A) corresponds to the general formula:

$$Mg_{3.7}Ti(OC_3H_7)_2Cl_{8.5}$$

(b) Preparation of a prepolymer 3 litres of n-hexane which is heated to 70° C., 16.5 milliliters of a molar solution of tri-n-octylaluminium (TnOA) in n-hexane, and a quantity of solid catalyst (A) containing 12 milligram-atoms of titanium are introduced under nitrogen into a 5-liter stainless steel reactor fitted with a stirring system rotating at 750 revolutions per minute and a heating and cooling system. A quantity of hydrogen corresponding to a partial pressure of 0.05 MPa is then introduced, followed by ethylene at a flow rate of 160 g/h for 3 hours. The prepolymer obtained (B) is then dried in a nitrogen atmosphere. It contains 0.025 milligram-atom of titanium per gram.

(c) Ethylene polymerisation

A steel fluidised bed reactor comprising a vertical cyclindrical section 6 m in height and 0.9 m in diameter, with a disengaging zone on top and fitted with a fluidisation grid at its bottom, is used to carry out a catalytic gas phase polymerisation of ethylene at 90° C., at a total pressure of 1.8 MPa, by means of an upward gas stream travelling at a velocity of 45 cm/s and consisting of hydrogen, ethylene and nitrogen under the following partial pressures:

PP of hydrogen=0.6 MPa

PP of ethylene=0.8 MPa

PP of nitrogen=0.4 MPa.

270 Kg of polyethylene whose particles have a mean diameter of 650 microns and an apparent density of 0.42 g/cm³ at rest are introduced into the reactor as a powder charge to start the operation.

96 g of prepolymer (B) are introduced at a regular 5-minute intervals into the reactor. 90 Kg/h of polyethylene powder are collected by draining at regular intervals, while the height of the fluidised bed is kept constant.

The pressure difference between the lower level in the fluidised bed at a point situated a few centimetres above the fluidisation grid and a point situated above the upper level of the fluidised bed, in the disengaging zone, is measured. The pressure difference is measured by means of probes connected to a piezoelectric sensor which produces an electrical signal, which is a voltage which is an analog image of the variations in the differential pressure. This signal is processed in a computer which is programmed to sample the signal at a high frequency, converting it to digital values, to calculate the mean of these values, to substract this mean from the instantaneous values, to carry out a Fourier transformation using the differences obtained, to calculate the values of the auto-correlation spectrum and to display this spectrum.

The signal produced is sampled and processed after 5 hours' polymerisation, while the fluidised bed is in a stable operating regime. The autocorrelation spectrum is obtained, and shows that the analog signal is a mixture of several signals, all of whose frequencies are below 2 Hz. The reactor is stopped, degassed, and emptied of copolymer powder. When this powder and the reactor are inspected, it is found that the powder consists of separate granules and that it is completely devoid of agglomerates. The reactor, including the fluidisation grid, are completely free from deposit.

EXAMPLE 2

A gas phase copolymerisation of ethylene and 4-methyl-1-pentene is carried out at 80° C. in the same reactor, under a total pressure of 1.1 MPa by means of an upward gas stream travelling at a velocity of 45 cm/s, consisting of hydrogen, ethylene, 4-methyl-1-pentene and nitrogen under the following partial pressures:

PP of hydrogen=0.14 MPa

PP of ethylene=0.64 MPa

PP of 4-methyl-1-pentene=0.18 MPa
PP of nitrogen=0.64 MPa.

A powder charge is introduced into the reactor to start the operation, consisting of 270 kg of a copolymer of ethylene and 4-methyl-1-pentene in powder form, with a weight content of units derived from 4-methyl-1-pentene of 11%, a density of 0.915 (at 20° C.), an apparent density of 0.28 g/cm$^3$ at rest, a 4% weight content of copolymer which is soluble in n-hexane at 50° C., this powder consisting of particles with a mass mean diameter of 720 microns.

96 g of the prepolymer (B) are introduced into the reactor at regular intervals of a minute and 90 kg/hour of a copolymer of ethylene and 4-methyl-1-pentene in powder form are collected sequentially while the height of the fluidised bed is kept constant.

The reactor is fitted with a differential pressure sensor and a computor, which are identical to those described in Example 1, the computer being programmed to perform the same operations as in Example 1.

After 5 hours' copolymerisation, the analog signal produced by the differential pressure sensor is sampled, as previously, and the autocorrelation spectrum of the signal, which is the spectrum shown in FIG. 4, is established. This spectrum shows that, in addition to the signals whose frequencies lie between 0 and 2 Hz, the signal contains new signals whose frequencies lie close to 10 Hz, and is thus clearly distinct from the normal spectrum frequencies.

The reactor is stopped, degassed, and emptied of the copolymer powder. When this powder and the reactor are inspected, it is found that the powder is sticky and that above the fluidisation grid it has formed a layer, 0.2 cm in thickness, consisting of a compact, non-fluidisable powder, which adheres to the grid and which partly obstructs the holes in the latter. The copolymer is also seen to contain agglomerated nodules with a diameter of approximately 3 cm. Had the reactor continued to operate under these conditions, these nodules would have grown and it would have been necessary to stop the reactor.

We claim:

1. A process for detecting anomalies in a fluidised bed contained in an enclosure and preventing further development of such anomalies comprising:
    at least intermittently sensing the pressure at at least one level in the fluidised bed, the pressure being sensed by at least one pressure sensor which produces an analog signal;
    determining the normal spectrum of frequencies present in the said signal when the fluidised bed operates under normal conditions free from anomalies;
    detecting the appearance in the said signal of frequencies distinct from, and higher than, frequencies in said normal spectrum which correspond to the presence of anomalies in the fluid bed; and
    modifying the fluid bed conditions causing the anomalies upon detection of said frequencies distinct from the frequencies in said normal spectrum to prevent continuation of the increase of said anomalies.

2. Process according to claim 1 wherein the sensing of the pressure is continuous.

3. Process according to claim 1 wherein the detection of frequencies distinct from frequecies in the normal spectrum is carried out by sampling the analog signal to obtain sample signals and Fourier transformation of said sample signals.

4. Process according to claim 1 wherein the detection of frequencies distinct from frequencies in the normal spectrum is obtained by detecting such distinct frequencies to the exclusion of the frequencies in the normal spectrum.

5. Process according to claim 1 wherein the pressure difference between two levels in the fluid bed is sensed by two pressure sensors at least one of which is in the fluidised bed.

6. Process according to claim 5 wherein said enclosure has a fluidisation grid and wherein one of said pressure sensors is disposed immediately above said grid and the other of said pressure sensors is disposed above said one of said sensors.

7. Process according to claim 6 wherein said other of said sensors is disposed above said fluidised bed.

8. Apparatus for detecting anomalies in a fluidised bed contained in an enclosure and controlling the conditions in said bed comprising:
    at least one pressure sensor which measures the pressure at least at one level in the fluidised bed and provides analog signals corresponding to the pressure;
    processing means for processing the analog signals produced by the said pressure sensor and providing output signals at frequencies above the signal frequencies present when the fluidised bed is operating under normal conditions; and
    means connected to said processing means and responsive to said signals at frequencies above said signal frequencies under normal conditions for indicating the presence of anomalies of operation in the said fluidised bed.

9. Apparatus according to claim 8 wherein said processing means comprises sampling means for sampling said analog signals and providing digital signals corresponding thereto, calculating means connected to said sampling means for calculating the differences between the instantaneous value and the mean value of said digital signals, transforming said differences into Fourier transform data and calculating a correlation spectra from said data and indicating means for indicating the presence of frequencies in the last-mentioned said spectra which are above said signal frequencies present when the fluidised bed is operating under normal conditions and which correspond to anomalies in said bed.

10. Apparatus according to claim 8 wherein there are two pressure sensors, at least one of which is disposed in said fluidised bed and one of which is disposed above the other of said pressure sensors.

11. Apparatus according to claim 10 wherein each of said pressure sensors is a differential pressure sensor and each comprises two pressure-pickup tubes which enter the said enclosure at two different levels and the ends of which in the enclosure has a porous filter thereon, wherein said tubes are connected to a differential piezoelectric transducer and further comprising a duct for neutral purge gas which is connected to each pressure-pickup tube between the said transducer and each of the said filters.

12. Apparatus according to claim 8 wherein said processing means comprises means for comparing the analog signals with previously determined analog signals obtained when the fluidised bed is operating under normal conditions.

13. Appartus according to claim 12 wherein said processing means comprises means for discriminating between analog signals corresponding to pressure fluctuations and signals caused by background noise.

* * * * *